Feb. 6, 1923.                                              1,444,065
F. J. ECKER.
COTTER PIN.
FILED FEB. 6, 1922.

Inventor
Frank J. Ecker
by
Thurston Kwis & Hudson
att'ys

Patented Feb. 6, 1923.

1,444,065

UNITED STATES PATENT OFFICE.

FRANK J. ECKER, OF CLEVELAND, OHIO, ASSIGNOR TO THE LAMSON AND SESSIONS COMPANY, OF CLEVELAND, OHIO, A CORPORATION OF OHIO.

COTTER PIN.

Application filed February 6, 1922. Serial No. 534,346.

*To all whom it may concern:*

Be it known that I, FRANK J. ECKER, a citizen of the United States, residing at Cleveland, in the county of Cuyahoga and State of Ohio, have invented a certain new and useful Improvement in Cotter Pins, of which the following is a full, clear, and exact description.

This invention relates to certain improvements in cotter pins, and the principal object of the invention is to so form the point of the cotter pin that the hole in which the cotter pin is to be inserted can be readily "found," and in addition is so formed that the free ends of the cotter pin can be readily spread after the cotter pin has been extended through the hole or opening designed to receive it.

The invention may be briefly summarized as consisting in certain novel details of construction which will be described in the specification, and set forth in the appended claims.

Figure 1:
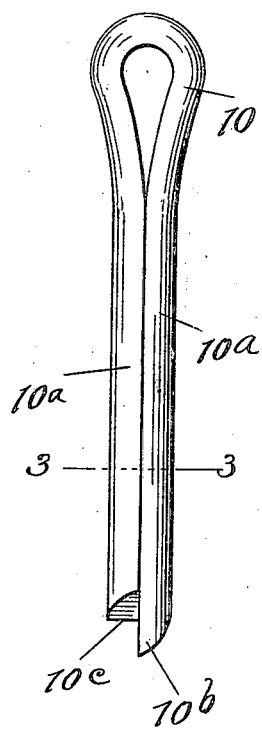
Figure 2:
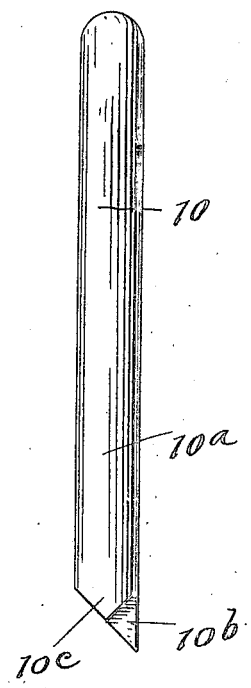
Figure 4:
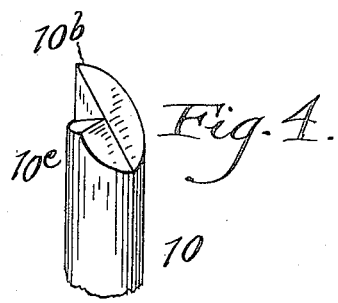
Figure 3:

In the accompanying sheet of drawings, Fig. 1 is a side view of a cotter pin embodying the present invention; Fig. 2 is a similar view with the cotter pin turned 90°; Fig. 3 is a view looking toward the pointed end of the cotter pin, the parts of which are to be spread to lock it in position; and Fig. 4 is a perspective view of the end of the cotter pin.

Referring now to the drawings, which show the preferred embodiment of my invention, the cotter pin as a whole is designated by the reference character 10. The cotter pin as is usually the case, is formed of half-round or substantially half-round wire doubled upon itself to form two legs or sections $10^a$ which for the major portion of their length have their flat faces engaging each other so as together to form a body circular or substantially circular in cross section.

The present improvements reside in novel construction at the free ends of the two cotter pin sections $10^a$, and these will now be described.

It will be noted that the free end of one of the sections $10^a$ of the cotter pin is cut diagonally across the entire end thereof, forming a point $10^b$ which is preferably but not necessarily cut on a 45° angle. It is to be noted that the extreme point or apex of the angle is located at the side of the cotter pin or at the junction of the flat and half-round surfaces.

The free end of the other section or leg of the cotter pin is tapered or chamfered in two planes as shown at $10^c$, the planes being preferably at right angles to each other. Preferably one face of this double beveled end $10^c$ coincides with the face or plane of cut of the single beveled end $10^b$, and since the other face of the end $10^c$ is at right angles to the first mentioned face, the end $10^c$ is in the form of a wedge, the apex of which is on a line extending from the side of the cotter pin into the center thereof, or is in a line intersecting the axis of the cotter pin.

It will be observed that with this construction wherein the end of one section of the cotter pin is tapered in two directions from the center, and wherein the other is tapered across the entire end in one plane only which coincides with the plane of cut or taper of one part of the end first referred to, a pointed section or portion projects outwardly beyond the end having the double taper. The protruding point referred to, makes it easy to insert a cotter pin in the hole to receive it, or to "find" the hole, and the fact that the apex or line of the wedge at the free end of the other section of the cotter pin terminates at a distance from the point referred to and at the center of the cotter pin, leaving a free flat protruding surface on the other section, renders it very easy for a workman to spread the ends of the cotter pin for he can drive to one side the leg having the point by striking with a hammer the portion which protrudes beyond the wedge-shaped end of the other and then in a similar manner can drive the latter section in the opposite direction. Furthermore, the construction is such that it is easy to run a spreading tool along the flat face of the protruding point and in between the two engaging flat faces and in that manner spread the ends of the cotter pin.

While I have shown the preferred construction and the preferred angles of cut, I do not desire to be confined to the exact details or angles shown, but aim in my claims to cover all modifications which do not involve a departure from the spirit and scope of my invention as defined in the appended claims.

Having described my invention, I claim:

1. A cotter pin composed of a piece of metal doubled upon itself, the end of one section of the pin being beveled in two planes and the end of the other section being beveled in one plane and having its point projecting beyond the double beveled end of the first mentioned section.

2. A cotter pin having two sections adapted to be spread, the end of one section and a portion of the end of the other section being cut or tapered in one plane, the remaining portion of the end of the second section being tapered in another plane.

3. A cotter pin having two substantially half-round sections adapted to be spread, the end of one section being in a diagonal plane so that said end terminates in a point, and the end of the other section being in two intersecting diagonal planes so that said end terminates in a line at a distance from said point.

4. A cotter pin having two substantially half-round sections adapted to be spread, the end of one section being cut on a taper of substantially 45° forming a point and the end of the other section being cut in two intersecting planes at substantially right angles to each other.

5. A cotter pin having two substantially half-round sections adapted to be spread, the end of one section being cut on a taper of substantially 45° forming a point and the end of the other section being cut in two intersecting planes at substantially right angles to each other, the plane of cut of the first named section and one of the planes of cut of the second named section coinciding.

In testimony whereof, I hereunto affix my signature.

FRANK J. ECKER.